Sept. 18, 1945.  H. J. DE N. McCOLLUM  2,385,096
HEATING APPARATUS
Filed June 5, 1943  2 Sheets-Sheet 2
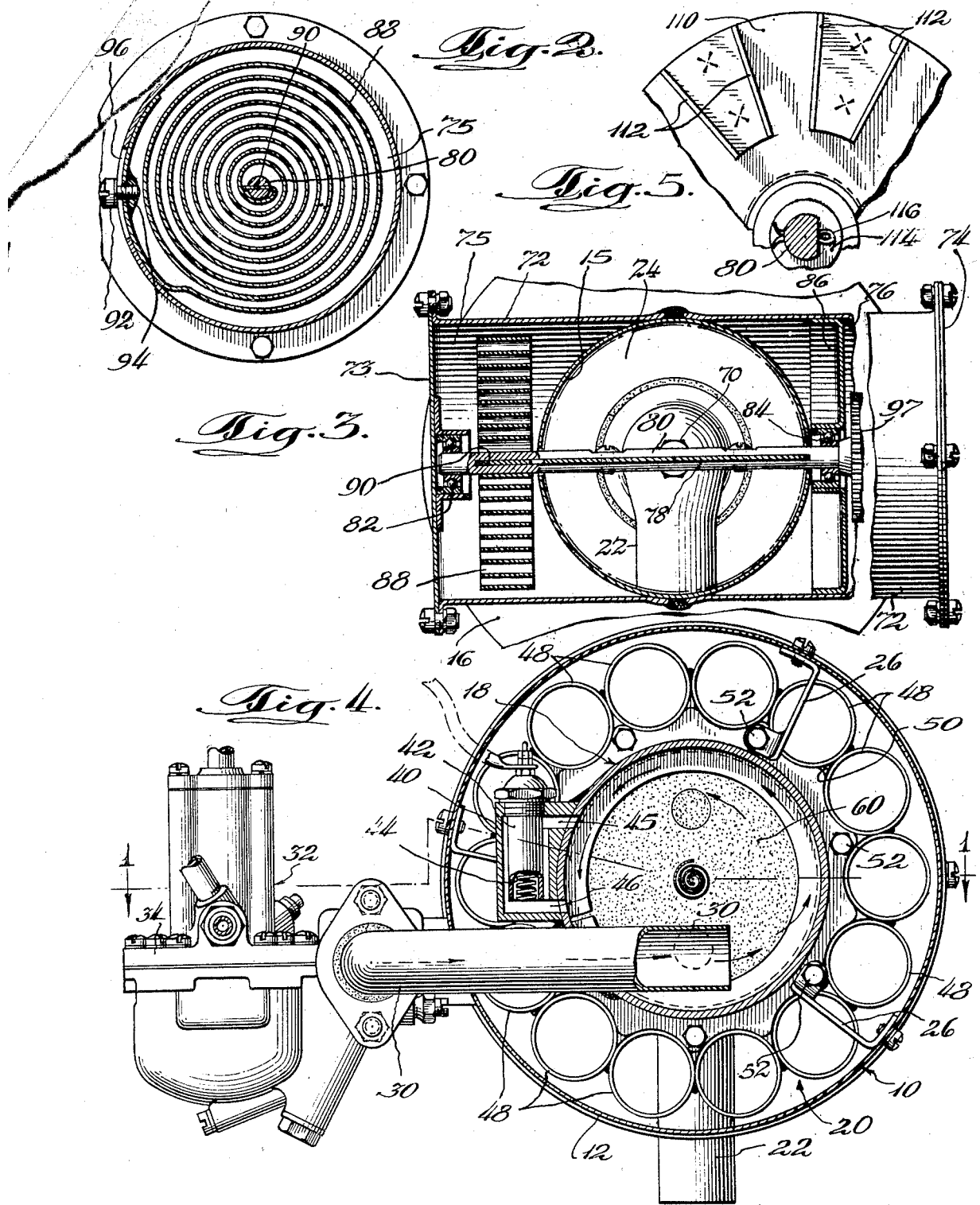
Inventor:
Henry J. De N. McCollum
By Williams, Bradbury & Hinkle
Attorneys Patented Sept. 18, 1945

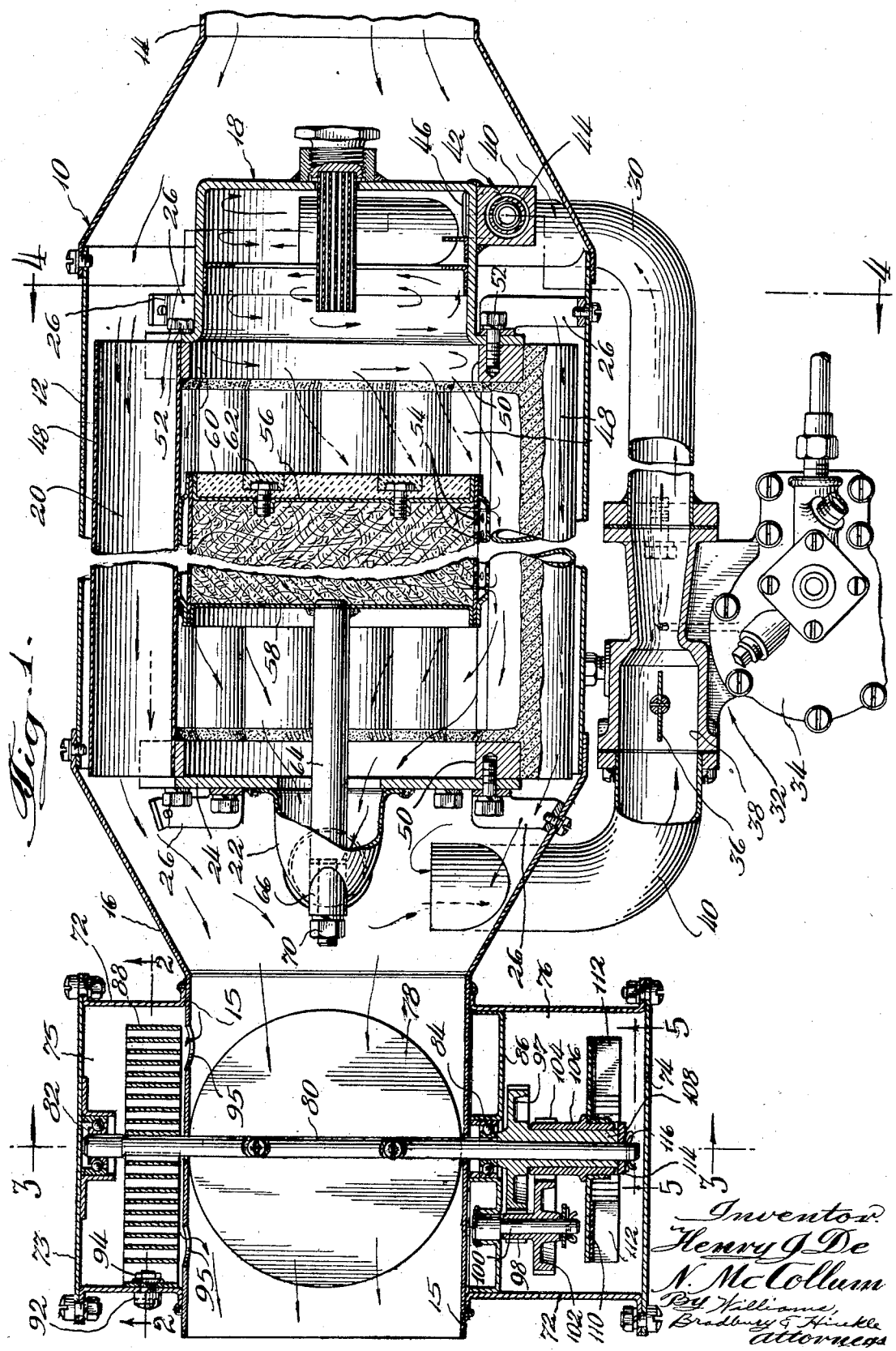

2,385,096

UNITED STATES PATENT OFFICE 2,385,096

HEATING APPARATUS

Henry J. De N. McCollum, Chicago, Ill.; Thelma McCollum executrix of said Henry J. De N. McCollum, deceased Application June 5, 1943, Serial No. 489,767

3 Claims. (Cl. 236—10)

My invention relates generally to heating apparatus, and more particularly to improvements in aircraft heaters of the internal combustion type.

In heating apparatus for aircraft in which the flow of the combustible mixture and of the ventilating air is the result of the dynamic air pressure at a ram or scoop opening in the skin of the aircraft, some difficulty of control has been encountered due to changes in ambient temperature. The rate of flow of combustible mixture and ventilating air changes considerably as the airplane is operated at different speeds and the heat output of the heater therefore changes, but because the rate of flow of ventilating air and of combustible mixture change substantially proportionately, the temperature of the heated ventilating air remains practically constant. However, changes in ambient temperature generally cause corresponding changes in the temperature of the heated ventilating air, and it is an object of my invention to provide improved means for preventing such temperature variations in the heater output.

A further object is to provide an improved aircraft heating apparatus in which an improved thermostatically controlled valve is utilized in the ventilating air output duct of the heater in order to control the pressure drop across the heater and thereby to regulate the rate of flow not only of the ventilating air but also of the air supplied for combustion.

A further object is to provide a simplified and improved thermostatic valve which is operated directly by the power derived from a bimetal element, and in which the speed of operation of the valve is governed.

A further object is to provide an improved temperature responsive flow regulating valve for ducts of relatively large cross-sectional area, and in which the valve element is operated directly by the thermostatic element.

Other objects will appear from the following description, reference being had to the accompanying drawings, in which:

Fig. 1 is a broken central longitudinal sectional view of the heating apparatus;

Fig. 2 is a transverse sectional view of the thermostatic bimetal element taken on the line 2—2 of Fig. 1;

Figs. 3 and 4 are transverse sectional views of the heating apparatus taken on the lines 3—3 and 4—4, respectively, of Fig. 1; and, Fig. 5 is a fragmentary sectional view of the valve movement-governing element.

Referring to Fig. 1, the heater comprises an outer casing 10 which includes a cylindrical portion 12, a flared end inlet duct 14, and a ventilating air outlet duct 15, which includes a flared portion 16. Within the casing 10 there is provided a combustion chamber member 18, a heat exchanger assembly 20 at the outlet end of which is secured an exhaust elbow conduit 22, the latter being welded to or otherwise suitably secured to a heat exchanger end plate 24. The combustion chamber member and heat exchanger assembly are secured in the casing 10 by suitable brackets 26. The inlet duct 14 is connected to a source of dynamic air pressure, such as provided by a ram opening or a scoop acted upon by the dynamic pressure of the air stream while the aircraft is in flight, as well as by the wash of the propeller when the airplane engines are operating while the plane is on the ground.

A combustible mixture is supplied to the combustion chamber through an induction tube 30, which receives a fuel mixture from a carbureting device 32 having a float bowl 34. A throttle valve 36, which may be manually operated or may be remotely controlled by automatic means, is located within the inlet bore 38 of the carburetor. Air for admixture with the fuel in the carburetor 32 is supplied through an elbow-shaped tube 40, the open end of which projects through the tapered casing portion 16 and has its opening substantially along the line of flow of ventilating air, and is thus subjected substantially solely to the static air pressure within the heater casing. It will be noted that the tube 40 terminates near the outlet end of the heat exchanger so that it withdraws preheated air for the carburetor 32.

As best shown in Fig. 4, the induction tube 30 extends through the wall of the combustion chamber member 18 in a generally tangential direction. Admission of the mixture to the combustion chamber in this manner facilitates combustion. At the side of the combustion chamber member 18 is located an igniter bracket 40, which is bored to receive an electrical igniter 42. This igniter is illustrated as being of the electrically heated hot wire type including a high resistance heating wire 44. The bore within the igniter bracket 40 communicates with the combustion chamber through an air admitting passageway 45 and a discharge passageway 46. When the heater is in operation, a small proportion of the combustible mixture supplied through the induction tube 30 passes through the passageways 45, 46. The electrical igniter operates to preheat and partially vaporize the fuel flowing past it and thus very rapidly raises the temperature of the latter above its ignition temperature. Thereafter, a more or less continuous flame discharges into the combustion chamber in the manner of a pilot flame which rekindles the mixture in the combustion chamber should it, for any reason, become extinguished.

The heat exchanger 20 comprises a plurality of tubes 48, which are brazed or silver-soldered to scalloped ring elements 50, the latter being secured to the combustion chamber member 18 and end plate 24, respectively, by cap screws 52. An acoustic vibration-damper or muffler is located within the cylindrical portion of the heat exchanger and comprises a pair of spaced cylindrical shells 54 which have perforations registering with the longitudinal spaces between the tubes 48. The ends of the shells 54 are closed by flanged plates 56 and 58, while the space within the inner shell 54 is preferably partially filled with an acoustic damping material, such as rock wool.

The flange plate 56 is directly exposed to the hottest portion of the flame and is therefore preferably protected by a ceramic disc 60, which is secured to the flange plate 56 by cap screws 62, the heads of the latter being preferably protected by a suitable plastic refractory material. The muffler is held within the heat exchanger by a stud 64, one end of which is riveted to the flange plate 58, and the other end of which projects through a suitably formed boss 66 formed on the exhaust conduit 22, the stud 64 being clamped in position by a nut 70.

The outlet duct 15 for ventilating air is best shown in Fig. 3 as having a portion thereof enclosed by a two-part welded housing 72, the ends of the housing 72 being enclosed by suitable cover plates 73, 74, thereby providing two chambers 75 and 76 on diametrically opposite sides of the duct 15. A butterfly valve 78 is suitably secured to a slotted stem 80, one end of which is mounted for free rotation in an anti-friction bearing assembly 82 carried by the cover plate 73. The other end portion of the shaft 80 has a bearing in an anti-friction assembly 84, which is mounted in a bearing support plate 86 fitted in the casing 72.

A spiral bimetal 88 has its innermost coil terminating in a slot 90, formed in the stem 80, while the outer extremity of the spiral bimetal 88 is adjustably secured to the housing 72 by a bolt 92 threaded in a nut 94 which is welded or otherwise secured to the end of the bimetal 88. The bolt 92 extends through an elongated slot 96 (Fig. 2) and thus may have its setting changed to vary the adjustment of the position of the valve element 78 for a given initial temperature.

The chamber 76, within which the bimetal 88 is located, communicates freely with the interior of the outlet duct 15 through openings 95. Due to the fact that the heated ventilating air flows rapidly past these openings, circulation of heated air through the chamber 75 is assured, and the bimetal 88 will thus be maintained at substantially the temperature of the air leaving the heater.

A gear 97 is non-rotatably secured to the stem 80 and meshes with a pinion 98 rotatably mounted upon a bearing stud 100. A gear 102 is formed integrally with the pinion 98 and meshes with a pinion 104 formed on a sleeve 106, the latter being rotatable on the hub 108 of the gear 96.

For convenience in non-rotatably securing the gear 97 and its sleeve hub 108 to the stem 80, the latter may have a flat portion, that is it may be of "D" cross-section, and the bore through the sleeve hub 108 may be correspondingly shaped.

A fan wheel plate 110 is secured to the outer end of the sleeve 106 and has a plurality of generally radial fan blades 112 welded thereto. Two of the blades 112 may be formed of a single stamping, generally U-shaped in transverse section, and spot-welding to the disc 110 effected as indicated in Fig. 5. The sleeve 106 is retained on the hub 108 by a keeper washer 114 and a cotter pin 116.

In the operation of the heater, the inlet duct 14 is connected to a scoop or ram on the aircraft, or to any other source in which the pressure and temperature may vary substantially, and through suitable electrical controls the electrical igniter is energized, thus causing ignition of the mixture flowing to the combustion chamber 18 of the heater. It will be noted that some of the heated air is drawn into the carbureting device through the tube 40, thus securing more complete vaporization of the fuel, which consequent improvement in combustion. The exhaust elbow 22 is suitably connected to the atmosphere, preferably at a point at which the pressure is reduced when the aircraft is in flight.

The outlet duct 15 usually leads to a hot air duct system for distributing the heated air to different parts of the aircraft.

The rate at which fuel is supplied to the combustion chamber will tend to change as the speed of the airplane changes because a change in dynamic air pressure at the scoop or ram resultant from a change in speed of the aircraft will be reflected in a change in pressure at the opening of the tube 40. When the airplane is operating at high speed, the rate at which the fuel is introduced into the combustion chamber increases the heat output of the heater but the temperature of the ventilating air at the outlet of the heater remains practically constant because of its increased flow rate. However, changes in ambient temperature are directly reflected in the temperature of the ventilating air leaving the heater. The tendency of this effect of changes in ambient temperature is counteracted by the thermostatically controlled valve 78. As the temperature of the ventilating air leaving the heater increases, the bimetal element 88 flexes in a direction to cause the valve to move further toward its full open position. Such movement of the valve is at a controlled rate due to the fact that the gear-driven fan governor 112 is directly connected to the valve stem 80. Such opening of the valve 78 results in a drop in pressure at the inlet opening of the tube 40, and consequent reduction in the heat output of the heater and increase in the flow rate of the ventilating air, both of these factors contributing to a decrease in the temperature of the ventilating air.

On the other hand, as the temperature of the ventilating air leaving the heater decreases, the thermostatic element 88 applies a torque to the valve stem 80 in a direction to close the valve 78. Such closing movement of the valve 78 is likewise at a controlled rate by virtue of the effect of the governor 112 and increases the ventilating air temperature by virtue of the increased pressure and hence increased flow rate of the combustible mixture and decreased flow rate of the ventilating air.

Thus, the valve 78 will move slowly from position to position and regulate the pressure of the air for combustion and control the output in a manner to maintain the temperature of the ventilating air leaving the heater substantially constant.

Whenever the ambient temperature increases, as, for example, when the aircraft is descending from a high altitude to a lower altitude, the resulting increase in the temperature of the ventilating air causes the valve 78 to be thermostatically operated in a direction to cause a decrease in the pressure at the outlet 15, 16, and decrease the rate of heat production, and vice versa, with the net result that the ventilating air temperature remains substantially constant.

The valve 78, being mounted in antifriction bearings, may be readily operated directly by the bimetal coil 88, but, due to the provision of the governor mechanism, the changes in position of the valve take place slowly and there is thus no tendency toward over-control. The fan governor acts effectively as a device to damp oscillations in the valve positioning system, with consequent smooth regulation of the temperature of the ventilating air leaving the heater. By virtue of this simplified thermostatic control, the temperature of the air leaving the heater is accurately and smoothly regulated.

While I have shown and described a particular embodiment of the invention, it will be apparent to those skilled in the art that numerous modifications and variations thereof may be made without departing from the underlying principles of the invention. I therefore desire, by the following claims, to include within the scope of my invention all such modifications and variations by which substantially the results of the invention may be obtained through the use of substantially the same or equivalent means.

I claim:

1. In an aircraft heating apparatus of the sealed combustion type supplied with air from a scoop or ram, the air thus supplied being subject to wide variations in pressure and temperature, the heating apparatus having a ventilating air outlet duct having a connection for supplying combustion air to the heating apparatus, a valve controlling the flow of air through said duct, a stem for said valve, a bimetal thermostatic element operatively connected to one end of said stem, said element being located so as to be responsive to the temperature of the air flowing through said duct, a speed multiplying gear train connected to the other end of said stem, and a governor device driven by said thermostatic element through said gear train, whereby the speed of operation of said valve is controlled.

2. In an aircraft internal combustion type heating apparatus having a combustion and ventilating air inlet connected to a ram or scoop and having a ventilating air outlet duct and deriving its air for combustion from said duct, a valve controlling the flow of air through said duct, an element responsive to the temperature of the air flowing through said duct, a direct operating connection between said element and said valve, and a governor operatively connected to said valve to limit the speed of operation thereof by said element.

3. In an aircraft heating system incorporating a heater of the internal combustion type in which air for both combustion and ventilation is supplied by a ram or scoop, a ventilating air outlet duct, means withdrawing heated air from adjacent said duct for combustion in said heater, a valve controlling the flow through said duct, an element responsive to the temperature of the air flowing through said duct, an operating connection between said element and said valve, and a governor connected to said valve to control the speed of operation thereof by said element.

HENRY J. DE N. McCOLLUM.